US008188879B2

(12) United States Patent
Pederson

(10) Patent No.: US 8,188,879 B2
(45) Date of Patent: May 29, 2012

(54) LED LIGHT GLOBAL POSITIONING AND ROUTING COMMUNICATION SYSTEM

(75) Inventor: John C. Pederson, St. Cloud, MN (US)

(73) Assignee: Federal Law Enforcement Development Services, Inc., St. Cloud, MN (US)

( * ) Notice: Subject to any disclaimer, the term of this patent is extended or adjusted under 35 U.S.C. 154(b) by 751 days.

(21) Appl. No.: 12/126,589

(22) Filed: May 23, 2008

(65) Prior Publication Data

US 2008/0292320 A1    Nov. 27, 2008

Related U.S. Application Data

(60) Provisional application No. 60/931,611, filed on May 24, 2007.

(51) Int. Cl.
*G08B 5/22* (2006.01)
(52) U.S. Cl. .................. 340/815.45; 398/118; 398/172
(58) Field of Classification Search ............ 340/815.45, 340/691.1, 691.4, 691.8, 901, 902, 907, 908, 340/945, 961, 981, 983–985; 398/118, 128, 398/130, 135, 140, 172; 362/800; 345/55, 345/82

See application file for complete search history.

(56) References Cited

U.S. PATENT DOCUMENTS

| 700,678 | A | 5/1902 | Downie |
| 2,082,279 | A | 6/1937 | Fore |
| 3,469,686 | A | 9/1969 | Gutsche et al. |
| 3,701,043 | A | 10/1972 | Zuleeg et al. |
| 3,705,316 | A | 12/1972 | Burrous et al. |
| 3,863,075 | A | 1/1975 | Ironmonger et al. |
| 3,867,718 | A | 2/1975 | Moe |
| 3,889,147 | A | 6/1975 | Groves |
| 3,911,430 | A | 10/1975 | Jankowski et al. |
| 4,149,111 | A | 4/1979 | Coates, Jr. |
| 4,243,985 | A | 1/1981 | Quayle |
| 4,254,453 | A | 3/1981 | Mouyard et al. |
| 4,271,408 | A | 6/1981 | Teshima et al. |
| 4,298,806 | A | 11/1981 | Herold |
| 4,301,461 | A | 11/1981 | Asano |

(Continued)

FOREIGN PATENT DOCUMENTS

EP    0468822    1/1992

(Continued)

OTHER PUBLICATIONS

Komine T. et al, "Integrated System of White LED Visible-Light Communication and Power-Line Communication," 20020915; 20020915-20020918, vol. 4, Sep. 15, 2002, pp. 1762-1766.

*Primary Examiner* — Thomas Mullen
(74) *Attorney, Agent, or Firm* — Vidas, Arrett & Steinkraus, P.A.

(57) ABSTRACT

An LED light and communication system includes at least one optical transceiver, the optical transceiver including a light support and a processor. The light support has a plurality of light emitting diodes and at least one photodetector attached thereto. The processor is in communication with the light emitting diodes and the at least one photodetector, where the processor is constructed and arranged to illuminate at least one of the light emitting diodes to generate a light signal which in turn includes at least one embedded data packet. The at least one embedded data packet communicates global positioning system (GPS) location information.

5 Claims, 4 Drawing Sheets

U.S. PATENT DOCUMENTS

| | | | |
|---|---|---|---|
| 4,319,306 A | 3/1982 | Stanuch | |
| 4,336,580 A | 6/1982 | Mouyard et al. | |
| 4,342,944 A | 8/1982 | SpringThorpe | |
| 4,390,931 A | 6/1983 | Gorick et al. | |
| 4,445,132 A | 4/1984 | Ichikawa et al. | |
| 4,556,862 A | 12/1985 | Meinershagen | |
| 4,595,904 A | 6/1986 | Gosswiller et al. | |
| 4,615,131 A | 10/1986 | Wakatake | |
| 4,630,180 A | 12/1986 | Muraki et al. | |
| 4,630,183 A | 12/1986 | Fujita | |
| 4,633,280 A | 12/1986 | Takasu | |
| 4,654,629 A | 3/1987 | Bezos et al. | |
| 4,703,219 A | 10/1987 | Mesquida | |
| 4,716,296 A | 12/1987 | Bussiere et al. | |
| 4,720,835 A | 1/1988 | Akiba et al. | |
| 4,742,432 A | 5/1988 | Thillays et al. | |
| 4,799,135 A | 1/1989 | Inukai et al. | |
| 4,821,118 A | 4/1989 | Lafreniere | |
| 4,868,719 A | 9/1989 | Kouchi et al. | |
| 4,918,497 A | 4/1990 | Edmond | |
| 4,928,084 A | 5/1990 | Reiser | |
| 4,929,866 A | 5/1990 | Murata et al. | |
| 4,935,665 A | 6/1990 | Murata | |
| 4,954,822 A | 9/1990 | Borenstein | |
| 4,965,644 A | 10/1990 | Kawabata et al. | |
| 4,966,862 A | 10/1990 | Edmond | |
| 4,975,814 A | 12/1990 | Schairer | |
| 4,990,970 A | 2/1991 | Fuller | |
| 5,000,569 A | 3/1991 | Nylund | |
| 5,027,168 A | 6/1991 | Edmond | |
| 5,035,055 A | 7/1991 | McCullough | |
| 5,041,947 A | 8/1991 | Yuen et al. | |
| 5,045,767 A | 9/1991 | Wakatake | |
| 5,050,055 A | 9/1991 | Lindsay et al. | |
| 5,057,828 A | 10/1991 | Rousseau | |
| 5,067,788 A | 11/1991 | Jannson et al. | |
| 5,091,828 A | 2/1992 | Jincks et al. | |
| D324,921 S | 3/1992 | Stanuch et al. | |
| 5,093,768 A | 3/1992 | Ohe | |
| 5,097,397 A | 3/1992 | Stanuch et al. | |
| 5,097,612 A | 3/1992 | Williams | |
| 5,101,326 A | 3/1992 | Roney | |
| 5,122,943 A | 6/1992 | Pugh | |
| 5,136,287 A | 8/1992 | Borenstein | |
| 5,159,486 A | 10/1992 | Webb | |
| 5,172,113 A * | 12/1992 | Hamer | 340/907 |
| 5,182,647 A | 1/1993 | Chang | |
| 5,187,547 A | 2/1993 | Ninna et al. | |
| 5,193,201 A * | 3/1993 | Tymes | 398/172 |
| 5,198,746 A | 3/1993 | Gyugyi et al. | |
| 5,198,756 A | 3/1993 | Jenkins et al. | |
| 5,220,235 A | 6/1993 | Wakimizu et al. | |
| 5,224,773 A | 7/1993 | Arimura | |
| 5,233,204 A | 8/1993 | Fletcher et al. | |
| 5,235,498 A | 8/1993 | Van Dulmen et al. | |
| 5,283,425 A | 2/1994 | Imamura | |
| 5,296,840 A | 3/1994 | Gieffers | |
| 5,298,738 A | 3/1994 | Gebert et al. | |
| 5,302,965 A | 4/1994 | Belcher et al. | |
| 5,313,187 A | 5/1994 | Choi et al. | |
| 5,321,593 A | 6/1994 | Moates | |
| 5,357,123 A | 10/1994 | Sugawara | |
| 5,357,409 A | 10/1994 | Glatt | |
| 5,359,255 A | 10/1994 | Kawai et al. | |
| 5,359,669 A | 10/1994 | Shanley et al. | |
| 5,361,190 A | 11/1994 | Roberts et al. | |
| 5,362,971 A | 11/1994 | McMahon et al. | |
| 5,403,916 A | 4/1995 | Watanabe et al. | |
| 5,406,095 A | 4/1995 | Koyama et al. | |
| 5,410,453 A | 4/1995 | Ruskouski | |
| 5,419,065 A | 5/1995 | Lin | |
| 5,420,444 A | 5/1995 | Sawase et al. | |
| 5,422,623 A | 6/1995 | Bader et al. | |
| 5,426,417 A | 6/1995 | Stanuch | |
| 5,436,809 A | 7/1995 | Brassier et al. | |
| 5,450,301 A | 9/1995 | Waltz et al. | |
| 5,453,729 A | 9/1995 | Chu | |
| 5,471,371 A | 11/1995 | Koppolu et al. | |
| 5,475,241 A | 12/1995 | Harrah et al. | |
| 5,482,896 A | 1/1996 | Tang | |
| 5,490,048 A | 2/1996 | Brassier et al. | |
| 5,490,049 A | 2/1996 | Montalan et al. | |
| 5,491,350 A | 2/1996 | Unno et al. | |
| 5,498,883 A | 3/1996 | Lebby et al. | |
| 5,514,627 A | 5/1996 | Lowery et al. | |
| 5,516,727 A | 5/1996 | Broom | |
| 5,519,720 A | 5/1996 | Hirano et al. | |
| 5,526,237 A | 6/1996 | Davenport et al. | |
| 5,528,474 A | 6/1996 | Roney et al. | |
| 5,546,496 A | 8/1996 | Kimoto et al. | |
| 5,552,780 A * | 9/1996 | Knockeart | 340/991 |
| 5,567,036 A | 10/1996 | Theobald et al. | |
| 5,568,406 A | 10/1996 | Gerber | |
| 5,569,939 A | 10/1996 | Choi | |
| 5,575,459 A | 11/1996 | Anderson | |
| 5,580,156 A | 12/1996 | Suzuki et al. | |
| 5,585,783 A | 12/1996 | Hall | |
| 5,635,981 A | 6/1997 | Ribacoff | |
| 5,696,500 A | 12/1997 | Diem | |
| 5,734,343 A | 3/1998 | Urbish et al. | |
| 5,805,209 A | 9/1998 | Yuge et al. | |
| 5,809,161 A | 9/1998 | Auty et al. | |
| 5,948,038 A | 9/1999 | Daly et al. | |
| 6,035,053 A | 3/2000 | Yoshioka et al. | |
| 6,067,018 A | 5/2000 | Skelton et al. | |
| 6,091,025 A | 7/2000 | Cotter et al. | |
| 6,094,148 A * | 7/2000 | Henry et al. | 340/902 |
| 6,126,087 A | 10/2000 | Hedger et al. | |
| 6,166,496 A * | 12/2000 | Lys et al. | 315/316 |
| 6,249,340 B1 | 6/2001 | Jung et al. | |
| 6,268,788 B1 | 7/2001 | Gray | |
| 6,271,814 B1 * | 8/2001 | Kaoh | 340/815.45 |
| 6,271,913 B1 | 8/2001 | Jung et al. | |
| 6,369,849 B1 | 4/2002 | Rzyski | |
| 6,400,828 B2 | 6/2002 | Covell et al. | |
| 6,548,967 B1 | 4/2003 | Dowling et al. | |
| 6,600,899 B1 | 7/2003 | Radomsky et al. | |
| 6,683,590 B1 | 1/2004 | Pang et al. | |
| 6,690,294 B1 | 2/2004 | Zierden | |
| 6,819,677 B1 | 11/2004 | Nouzovsky et al. | |
| 7,023,469 B1 | 4/2006 | Olson | |
| 7,102,665 B1 | 9/2006 | Chandler et al. | |
| 7,103,614 B1 | 9/2006 | Kucik | |
| 7,183,895 B2 | 2/2007 | Bazakos et al. | |
| 7,230,884 B2 | 6/2007 | Shemesh | |
| 7,439,847 B2 | 10/2008 | Pederson | |
| 7,557,521 B2 | 7/2009 | Lys | |
| 7,583,901 B2 | 9/2009 | Nakagawa et al. | |
| 2003/0118216 A1 | 6/2003 | Goldberg | |
| 2003/0169164 A1 | 9/2003 | Lau | |
| 2003/0185340 A1 | 10/2003 | Frantz | |
| 2003/0222587 A1 | 12/2003 | Dowling, Jr. et al. | |
| 2004/0044709 A1 | 3/2004 | Cabrera et al. | |
| 2004/0151344 A1 | 8/2004 | Farmer et al. | |
| 2004/0208599 A1 | 10/2004 | Swartz et al. | |
| 2005/0111700 A1 | 5/2005 | O'Boyle et al. | |
| 2006/0149813 A1 | 7/2006 | Janik | |
| 2006/0213731 A1 | 9/2006 | Lesesky et al. | |
| 2007/0110446 A1 | 5/2007 | Hong et al. | |
| 2007/0145915 A1 | 6/2007 | Roberge et al. | |
| 2007/0160373 A1 | 7/2007 | Biegelsen et al. | |
| 2008/0154101 A1 | 6/2008 | Jain et al. | |
| 2008/0227463 A1 | 9/2008 | Hizume et al. | |

FOREIGN PATENT DOCUMENTS

| | | |
|---|---|---|
| EP | 0531184 | 3/1993 |
| EP | 0531185 | 3/1993 |
| EP | 0596782 | 5/1994 |
| EP | 0633163 | 1/1995 |
| EP | 0688696 | 12/1995 |
| EP | 0709818 | 5/1996 |
| EP | 0793403 | 9/1997 |
| EP | 0887783 | 12/1998 |
| EP | 0890894 | 1/1999 |
| EP | 0896898 | 2/1999 |
| EP | 1564914 | 8/2005 |
| FR | 2658024 | 8/1991 |

| | | | | | | |
|---|---|---|---|---|---|---|
| FR | 2680861 | 3/1993 | | GB | 2311401 | 9/1997 |
| FR | 2707222 | 1/1995 | | GB | 2323618 | 9/1998 |
| GB | 1241369 | 8/1971 | | JP | 60143150 | 7/1985 |
| GB | 2069257 | 8/1981 | | JP | 6333403 | 12/1994 |
| GB | 2111270 | 6/1983 | | JP | 8002341 | 1/1996 |
| GB | 2139340 | 11/1984 | | WO | 99/49435 | 9/1999 |
| GB | 2175428 | 11/1986 | | WO | 99/49446 | 9/1999 |
| GB | 2240650 | 8/1991 | | WO | 02/25842 | 3/2002 |
| GB | 2272791 | 5/1994 | | WO | 02/073836 | 9/2002 |
| GB | 2292450 | 2/1996 | | | | |

* cited by examiner

LED LIGHT GLOBAL POSITIONING AND ROUTING COMMUNICATION SYSTEM

CROSS REFERENCE TO RELATED APPLICATIONS

This application claims priority to U.S. provisional patent application Ser. No. 60/931,611 filed May 24, 2007, the disclosure which is expressly incorporated herein by reference.

STATEMENT AS TO RIGHTS TO INVENTIONS MADE UNDER FEDERALLY SPONSORED RESEARCH AND DEVELOPMENT

Not applicable.

FIELD OF THE INVENTION

This invention pertains generally to multiplex communications, and more particularly to versatile communications incorporating GPS locations into data packet headers and trailers. The data packet headers may then be transmitted based upon physical location, and various comparisons may be made between predetermined physical locations and electronic markers and position indicators used for many diverse, critical purposes. In more specific embodiments, Visual Light Embedded Communications (VLEC) are combined with GPS headers to provide many unexpected and novel benefits.

DESCRIPTION OF THE RELATED ART

Communication and data sharing have been important to humans throughout history. Cave writings, letters, books, magazines, newspapers, telegrams, telephones, fax machines, and Internet are all examples of the importance of communication and data sharing. As speed, accuracy, distance, and sometimes size of the desired communication. Increasingly, people are desiring this communication to be possible anywhere, anytime, whether on the go or just in a unique setting.

Currently, the main wireless method of communication uses radio waves to transmit or receive information. Wireless access can be gained through local, low-power transmitters, or through higher power cell phone towers which can be many miles apart. The cell phone system poses several well-known issues, the first of which is coverage. Presently, there are not enough towers to provide coverage in all areas, creating a likelihood of dropped calls in certain geographic areas. The possibility of dropped calls or dropped signal is a distinct disadvantage, and, in fact, could pose a hazard in the case of an emergency situation. The issue of full coverage is further augmented by a sensitivity to various types of radio frequency interference which also interferes with reception. Radio frequency interference and weak signals also raise the issue of one receiving false information, such as in the case of alternative information being transmitted or key information being left out or dropped in the case of weak or variable transmissions. Additionally, cell phone communications systems are quite limited in bandwidth or capacity for high-speed data communications.

Position determination may commonly be made using either of two existing systems. One is satellite-based, known as the Global Positioning System (GPS). Not only are satellite systems expensive and subject to atmospheric interference, they have other limitations as well. One such limitation is accuracy. GPS is accurate to within a couple hundred feet horizontally, but many drivers using GPS systems still find themselves frustrated when the GPS provides them with inaccurate directions, either causing them to arrive at the wrong destination, or being told to make a U-turn after following directions because the GPS is not accurate enough to correctly read the street that vehicle is on. Furthermore, current GPS devices do not have the capacity to store enough information to provide drivers with more than a crude map, making the identification of where one is unnecessarily difficult. Systems have been developed that conceptually provide photographic or even three-dimensional mapping and guidance, but storage of such data drastically exceeds portable GPS equipment capacity. Finally, satellites are not always accessible when there is not a line of communication with the satellite. For exemplary purposes, car-ports, overhangs, underpasses, garages, buildings and many other shelters and covers can interfere with or completely inhibit satellite reception. These communications can be skewed or blocked undesirably.

The second system uses triangulation from cell phone towers. This technique suffers from similar limitations of accuracy and coverage as the satellite system. Whether using GPS systems or cell phones, triangulation techniques are typically only accurate within several hundred feet. Horizontally, this precision is adequate for many applications. However, vertically several hundred feet could encompass twenty floors in an office, or apartment building, or many floors in a parking garage. In the case of an emergency, such as a fire or a medical emergency, knowing which floor or level can make a crucial life-or-death difference.

SUMMARY OF THE INVENTION

In some embodiments, the present invention is generally directed to light emitting diodes (LEDs) and applications thereof. In particular, some embodiments of the present invention are directed to using LEDs to generate light signals including data packets comprising global positioning system (GPS) location information.

GENERAL DESCRIPTION OF THE INVENTION

According to the invention, there is provided an illumination apparatus that is capable of illuminating a space and simultaneously capable of communicating through visible light directly with a number of adjunct devices. In addition to human communications, communications with adjunct devices may effect various convenience, safety, global positioning system routing systems (GPSRS), traffic control, energy management and related functions.

The present invention creates a much more reliable and accurate comparison for global positioning system (GPS) or instrument flight rules (IFR), and similar systems and services. Additionally, the present invention verifies data in real time through such a comparison. The present invention also incorporates improved real-time tracking of addresses which can be stationary or dynamic in their physical location, especially and is useful for identification of location based services that require the exact location of a vehicle or individual such as emergency vehicle repair services. The present invention ties data packets to geographic locations on a real-time basis rather than using cyber translations. As a corollary thereto, the present invention in real-time recognizes packeted information and the location of a vehicle or individual using accommodating technology. The present invention also includes the ability to use "mesh-networking," reducing data packet traffic on the "Network Backbone." The present invention incorporates the use real time locating systems for humans, permitting electronic monitoring and locating in or after emergency situations, or for simple real-time locators. Similarly, inanimate objects such as vehicles may be tracked through the network and accounted for automatically, using less sophisticated communications tags. Additionally, the present invention has the ability for unauthorized infrastructure detection, using an address system identifying the location of the device (GPS), a unique serial number, and a governing infrastructure list which may "lock out" devices not on the governing list. On an open road that is particularly useful because all can drive on the road but only those with authorization may access any data packets and only those with higher levels of clearance may alter the information. The present invention additionally includes sufficient communication bandwidth to incorporate smart video integration. Furthermore, the present invention has the ability to track an origin address upon receiving it, verifying the source in real time.

BRIEF DESCRIPTION OF THE DRAWINGS

The foregoing and other objects, advantages, and novel features of the present invention may be understood and appreciated by reference to the following detailed description of the invention, taken in conjunction with the accompanying drawings, in which.

DESCRIPTION OF THE PREFERRED EMBODIMENT

Figure 1:
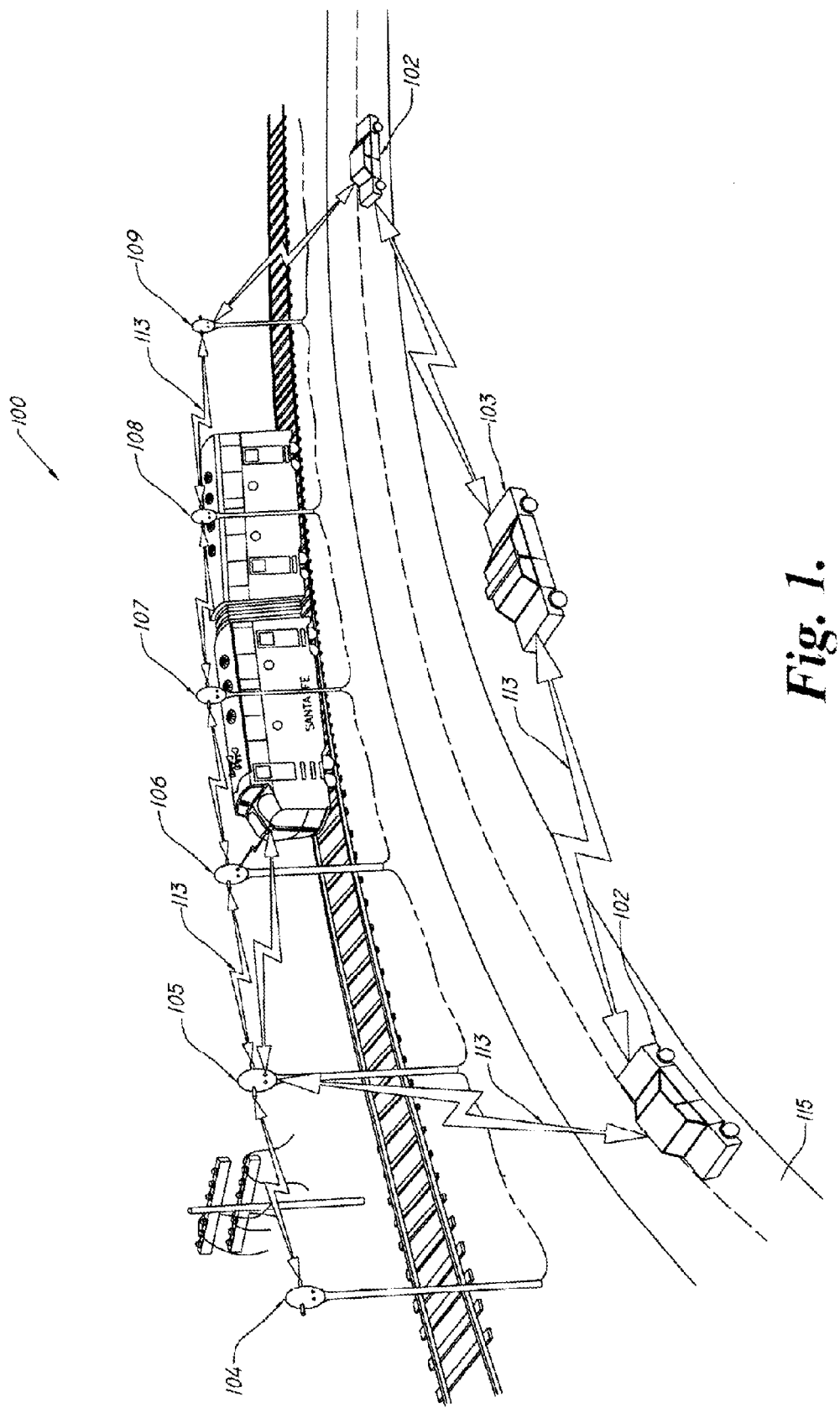
FIG. 1 illustrates a projected environmental view of one embodiment of a Global Positioning System Routing System or GPSRS system.

Manifested in the preferred embodiment GPSRS 100, the present invention provides visible light in combination with embedded communications. The embedded communications in accord with an embodiment of the invention further incorporate GPS routing information into communications networks. In accord with the present invention, there are two types of lights: static or stationary lights, such as a street lamps 104-109, or dynamic moving lights such as automobile lights found in vehicles 102 and patrol car 103. Stationary lights such as street lamps 104-109 are fitted with LED illumination and integral data communications, referred to herein as Visible Light Embedded Communications (VLEC). The physical location of each stationary light, in the form of GPS coordinates, is stored within that light in electronic form, preferably using Read-Only Memory (ROM) or the like, such that the address may not later be altered or tampered with. An address is a GPS location of the stationary light along with its unique manufacturer's embedded serial number. A computational system incorporating a microprocessor or the like is programmed to provide necessary communications functions to communicate through modulation of light emanating from the stationary light when interrogated by a client optical device. The client optical device may be another stationary light, or may alternatively be a moving light.

The preferred embodiment GPSRS 100, through retrieval of the GPS location, is capable of location determination resolution of a moving light to a single light fixture, and the light fixture is readily identifiable by GPS coordinates and serial number. Therefore, embodiments designed in accord with the teachings of the present invention have much more exact pinpointing than heretofore available. GPSRS 100 may be used to locate a person or vehicle immediately, even in a large area and/or among a large crowd, and can keep track of a large population simultaneously. Large bandwidth is afforded by optical communications, and permits video signals to be integrated where so desired.

Since location may be relatively precisely discerned, street lamps 104-109 or other appropriate street lamps may in one embodiment be configured to change color, flash, or otherwise be visually changed or manipulated to assist with directional guidance, personnel or intruder identification, energy management, or even to facilitate the meeting and connection of individuals. Each street lamp will incorporate at least one and possibly a plurality of optical transmitter LEDs and at least one and possibly a plurality of optical detectors.

A preferred optical transmitter, in accord with the present invention, preferably comprises at least one optical LED, and most preferably comprises an RGB LED array, designating that the LED includes Red, Green, and Blue which are the primary additive colors from which all other colors including white may be produced. For exemplary purposes only, an optical transmitter may comprise discrete LEDs of each primary color, or may alternatively be a single RGB LED array integrated onto a common die group, taking the physical form of a single LED. Furthermore, more than one RGB LED array may be integrated upon a single die group or within a common package or optical transmitter, as may be deemed most appropriate. In practice, there is no limit to the number of RGB LEDs that may be used, other than physical size and available space limitations, and thermal dissipation capacity and power requirement constraints.

By controlling the relative power applied to each one of the RGB LED arrays, different colors may be produced. Color televisions and computer monitors, for example, incorporate very small red, green and blue (RGB) dots adjacent to each other. To produce white regions on the screen, all three RGB dots are illuminated. Black dots are the result of none of the RGB dots being illuminated. Other colors are produced by illuminating one or more of the dots at different relative levels, or alternatively controlling how many closely adjacent dots of one primary color are fully illuminated relatively to the other two primary colors. The display of different colors can be used as a part of a visual signaling system, using particular colors as indicators of particular information.

While other options exist for producing white light from LEDs, the use of an RGB LED absent of phosphors is preferred for most applications of the present invention. Not only is color of the light easily controlled using well-known RGB technology, but also by their very nature phosphors tend to slow down the rate at which an LED may be illuminated and extinguished due to phosphor latencies. For the purposes of the present invention, where an optical communications channel is created using optical transmitter LEDs, higher data transfer rates may be obtained with more rapid control of illumination levels. Consequently, if phosphors are used in the generation of light, and if faster data exchange rates through optical communications are desired, these phosphors will preferably be very fast lighting and extinguishing.

An optical detector may either be a broad spectrum detector or alternatively color-filtered or sensitive to only a single color. The detector will be any of the many known in the art, the particular selection which will be determined by well-known considerations such as sensitivity, reliability, availability, cost and other consideration.

Greater details regarding the optical communications are found in our commonly assigned and co-pending patent applications identified below and filed simultaneously herewith, the contents and teachings which are incorporated herein by reference in entirety.

This application is related to the patent application entitled "LED Light Communication System," patent application Ser. No. 12/126,529, filed contemporaneously herewith, which is incorporated by reference herein in its entirety. The present application is also related to the patent application entitled "LED Light Dongle Communication System," patent application Ser. No. 12/126,227, filed contemporaneously herewith, which is incorporated herein by reference in its entirety. Further, the present application is related to the patent application entitled "Building Illumination Apparatus with Integrated Communications, Security and Energy Management," patent application Ser. No. 12/126,342, filed contemporaneously herewith, which is incorporated herein by reference in its entirety. The present application is related to the patent application entitled "LED Light Interior Room and Building Communication System," patent application Ser. No. 12/126,647, filed contemporaneously herewith, which is incorporated by reference herein it its entirety. Further the present application is also related to the patent application entitled "LED Light Broad Band Over Power Line Communication System," patent application Ser. No. 12/126,469, filed contemporaneously herewith, which is incorporated by reference herein in its entirety.

Applicant additionally incorporates by reference herein patent application Ser. No. 10/646,853, filed Aug. 22, 2003, U.S. Pat. No. 7,439,847, which claims the benefit of provisional patent application Nos. 60/405,592 and 60/405,379, both filed Aug. 23, 2002, the disclosures of all three being expressly incorporated herein by reference. Further, Applicant incorporates by reference herein patent application Ser. No. 12/032,908, filed Feb. 18, 2008, now abandoned, which is continuation of patent application Ser. No. 11/433,979, filed May 15, 2006, now abandoned, which is a continuation of patent application Ser. No. 11/102,989, filed Apr. 11, 2005, now issued U.S. Pat. No. 7,046,160, which is a division of patent application Ser. No. 09/993,040, filed Nov. 14, 2001, now issued U.S. Pat. No. 6,879,263, which claims the benefit of provisional patent application No. 60/248,894, filed Nov. 15, 2000, the entire contents of each being expressly incorporated herein by reference.

Street lamps 104-109 may be used to transmit one or more kinds of data, including identity, location, audio and video information, and various data signals. The data signals may arise through communications within a Local Area Network (LAN), sometimes referred to as an Intranet. The data may additionally or alternatively arise through communication with a Wide Area Network (WAN), commonly describing a network coupling widely separated physical locations which are connected together through any suitable connection, including for exemplary purposes but not solely limited thereto such means as fiber optic links, T1 lines, Radio Frequency (RF) links including cellular telecommunications links, satellite connections, DSL connections, or even Internet connections. Generally, where more public means such as the Internet are used, secured access will commonly separate the WAN from general Internet traffic. The data may further arise through communications with the Internet.

Figure 2:
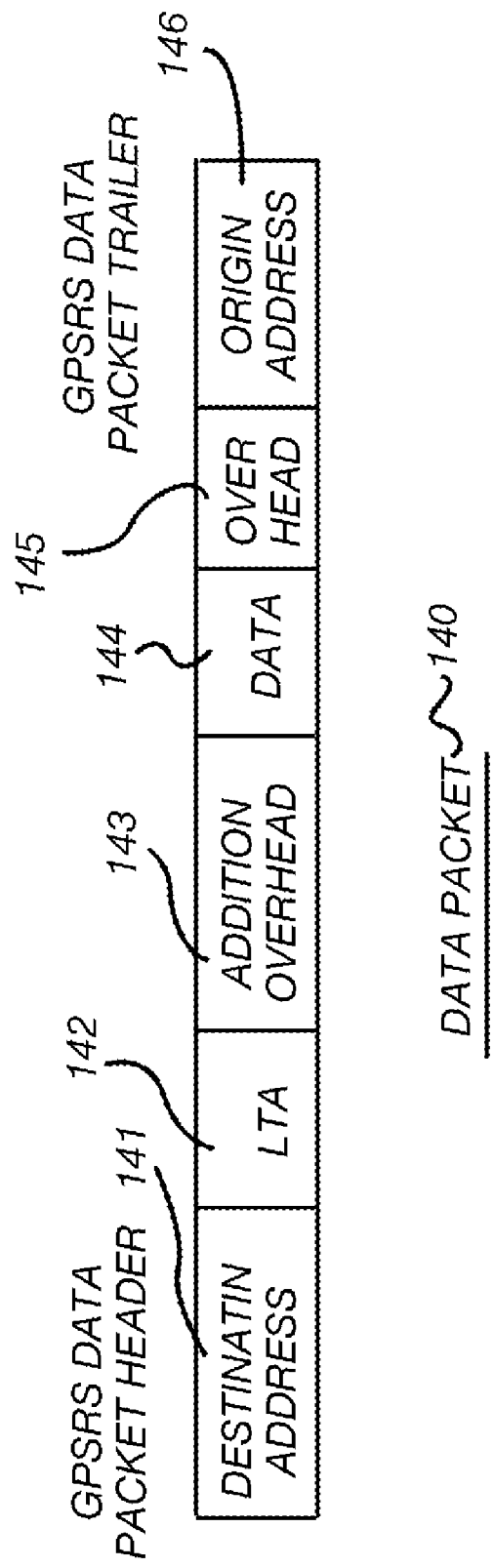
FIG. 2 illustrates a data packet structure incorporating GPS location information into the header and trailer.

FIG. 2 illustrates a sample data packet 140, having a destination address 141 that incorporates a desired GPS destination. LTA (Last light transceiver Transmission Address) 142, addition overhead 143, data 144, overhead 145 and origin address 146 round out the sample data packet 140. Since data packet 140 includes in destination address 141 a GPS identifier, each street lamp can simply read the address, and based upon the address which is a physical address, determine which direction to forward the data packet, to an appropriate adjacent street lamp. If the stationary street lamp has an Internal Location Address (ILA) closer to the data packet destination address than the LTA code stored within the data packet address code, then the stationary street lamp will insert its ILA code into the data packet address code as the new LTA code, and then forward the entire data packet to the next closer street lamp. No central look-up or translation is required of the origin and destination addresses, vastly reducing the computational effort of forwarding data packets. Furthermore, the data is communicated in a mesh-fashion, where each street lamp directly communicates with adjacent lamps and does not require central communications or processing. As a result, with little if any infrastructure required, other than VLEC illumination and appropriate processors and programming for each street lamp, signals may be quickly and directly routed from origin to destination.

Further in accord with the present invention, users of the system, which may be dynamic, may declare one or more static positions and have a dynamic position at any time. GPSRS 100 will track the user as he passes static lights, similar to that of cell phones in relation to their towers. Each user of the system can determine at any point what his static address is. A static address can be your office, your bedroom, your home, wherever it makes practical sense. The network should be comprised of a physical resolution practical for all foreseen applications. When a user leaves his static address to traverse through the infrastructure, he then becomes dynamic. If a packet of data comes to his static address, it will then be informed as to where his dynamic address is.

Techniques of forwarding and locating, considered or used for exemplary purposes with cellular telephones and other mobile systems, may be considered incorporated herein for purposes of enablement. However, in the present invention, it is further conceived that static components such as lights may preferably incorporate sufficient computer memory storage and processing capability to store basic information on each dynamic user who designates that static component as the "home" or base location. When a dynamic user leaves communication with the base location, and with each change to another static host, the dynamic user will preferably automatically communicate the current static address back to the dynamic user's base. When a data packet arrives at the static base, the base can simply change the destination address 141 to reflect the current location of the dynamic user. Once the dynamic user receives the data packet, communications may be made directly with the sender, rather than always routing through the dynamic user's base. To reduce the likelihood for dropped data packets, it is also desirable that some or all of the static components include information on recent dynamic clients. In other words, if a dynamic client changes static locations during the time a data packet is in transit from a base to the dynamic client, the packet will become lost. If, instead, the static components also track movement of dynamic clients to the next adjacent static host, then the static host would simply once more change the destination address, this time to the adjacent static host, which will then communicate the packet to the dynamic client.

Since optical communications channels 113 may be formed between any lights within optical reach, static or dynamic, a system is established where a collection of lights working together can broadcast-rather than being limited to a stationary address. Consequently, communications can occur, for exemplary purposes, between widely spaced street lights that cannot directly communicate, when such lights are bridged by a sufficient number of dynamic lights such as from automobiles 102 therebetween.

The present invention reduces overhead of infrastructure because it requires no translation. It removes the need for overhead management. Each packet knows its destination, the closest light. Presently, for example, cell phones must communicate with the closest towers, which may be many miles away, both for caller and destination, requiring many cables. With the new system, a cell phone would be informed of GPS and connect directly to the closest source.

The present invention is also simpler. According to the "last mile" concept, a large majority of the cost occurs in the last mile of transmission. With this system, the last mile is nearly free. The last mile develops itself.

The present invention has the ability to monitor in real time historically established GPS addresses at one or many street lights, and compare those addresses to currently calculated addresses. This comparison will preferably occur on a continuous basis, and can provide a cross-check for various position determining systems. Among these are the entire GPS infrastructure, and also various perhaps older airport systems such as IFR navigational tools and the like. In fact, nearly any electronic position detection system can be monitored through comparisons with established GPS locations determined at the time of set-up or installation of street lamps or other appropriate illumination devices. This monitoring can be very useful not only to detect potentially failed or improperly operating components, but also to provide emergency infrastructure in the event of jamming or skewing of the primary position locating system, irrespective of whether the jamming, skewing or malfunctions are accidental or terroristic. Desirably, if a discrepancy is detected between static devices of the present invention such as light posts 104-109 and a position determining system such as GPS or IFR devices, then a communication will preferably be initiated to notify appropriate personnel.

Figure 3:
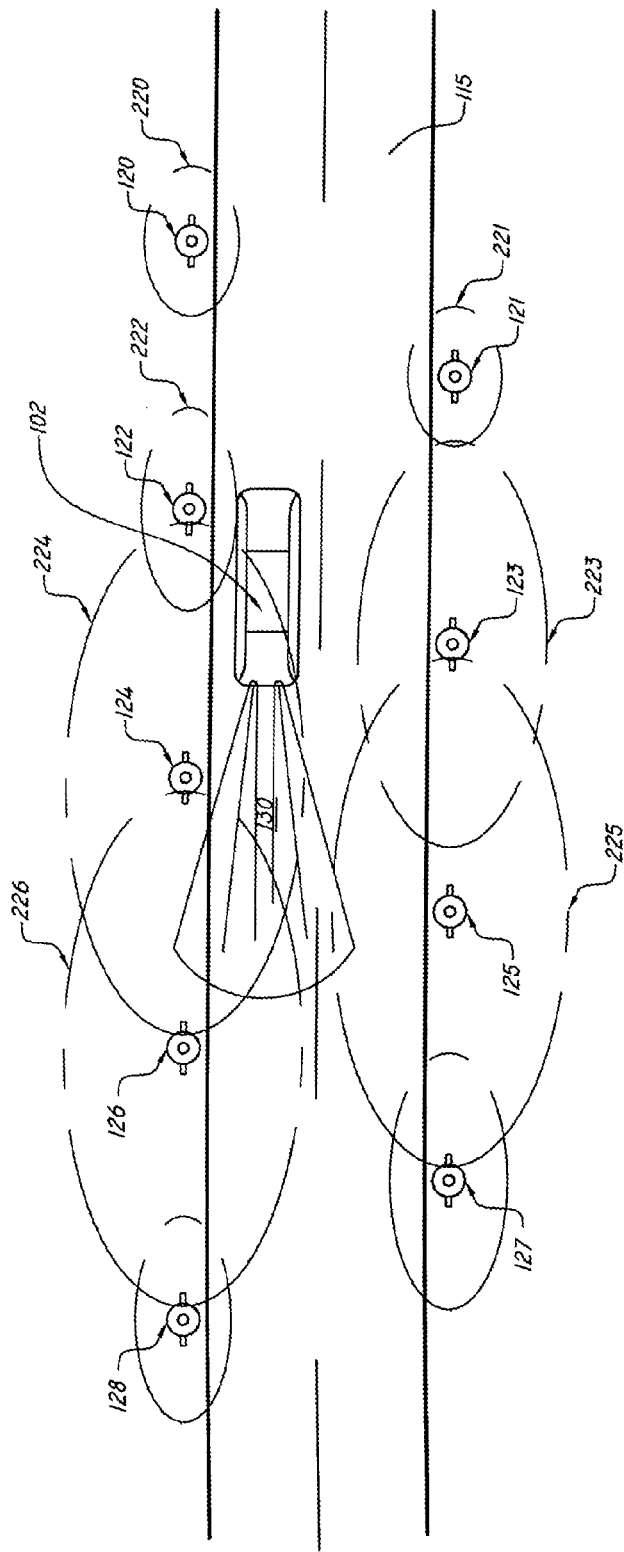
FIG. 3 illustrates from top view a street lamp illumination and communications system operative with a vehicle traveling therein.

FIG. 3 illustrates an energy management method in accord with the teachings of the present invention, whereby when a section of road 115 is otherwise generally vacant, a large number of street lights may be dimmed or extinguished. Street lights 120-128 are preferably programmed to turn on and off as circumstances dictate. Busy intersections and metropolitan areas will have a large number of street lights. These lights, in accord with an embodiment of the invention, will have power lines with data carriers provided therewith, such as Broadband-over-Power Line (BPL) or the like. Static GPS locations are preferably encoded into each light 120-128. A vehicle 102 driving through an area with street lights could interact with and automatically illuminate only those lights needed for travel. As vehicle 102 progresses down road 115, lights behind may be no longer needed and so may be programmed to turn off. Consequently, each of street lights 120-128 could function variably from 0 to 100% as needed. As is shown in FIG. 3, street lights 120, 121 significantly behind vehicle 102 are producing less illumination 220, 221. Immediately behind vehicle 102 street light 122 is also starting to decrease illumination 222. Lights 123, 124 immediately next to and close in front of vehicle 102 preferably function at, or close to 100%, producing larger amounts of illumination 223, 224. Going farther in front of vehicle 102, lights 125, 126 are most preferably not yet to full function, though close, giving off partial light 225, 226. In such a manner, with street lights brightening as a vehicle 102 approaches and dimming and eventually extinguishing after vehicle 102 passes, a moving "bubble" of illumination surrounds vehicle 102.

Additionally, in the case of a lighted intersection, additional lights on the cross-road may also be triggered to light up, providing vehicle 102 with a clear view of any possible cross-traffic, vehicle or otherwise. With appropriate central computer control and programming which will be readily understood and achieved by those skilled in the computer arts, the illumination of these neighboring lights can be increased, to provide sufficient illumination to ensure the safety of vehicle 102. Since different persons will have different desires regarding the extent of adjacent illumination, an embodiment of the present invention may incorporate custom programming of such features by individual vehicle 102, or within standard preset selections, such as "cautious" where a relatively large number of lights are illuminated adjacent to vehicle 102, or "carefree," where only a minimum number of lights are illuminated. Again, the level of illumination may additionally vary with relation to the vehicle, the geometry of the road space, in accord with personal preferences, or for other reasons.

Illumination control in the preferred embodiment is the result of programming and data communication between LED illumination 130 from automobile 102 and street lights 120-128. However, in one embodiment street lights 120-128 may simply sense the presence of illumination 130, whether carrying embedded communications or not. In such case, street lights 120-128 would also illuminate for a person walking with a flashlight.

Figure 4:
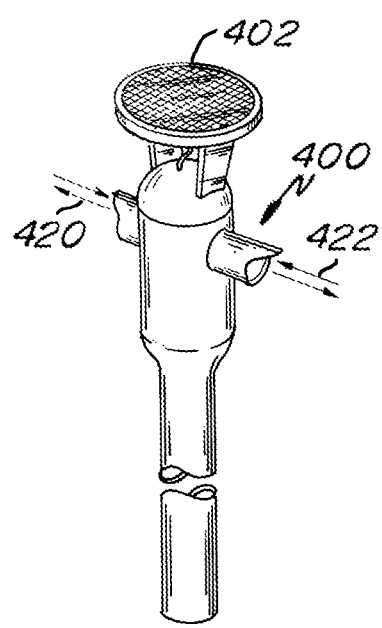
FIG. 4 illustrates an isometric plan view of an embodiment of an information transmission corridor in accord with the teachings of the present invention.
Figure 5:
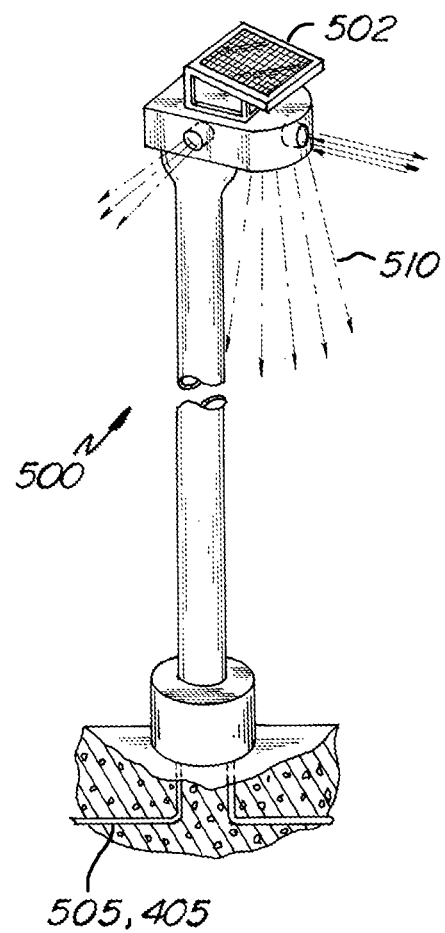
FIG. 5 illustrates an isometric plan view of an embodiment of a street light post light post in accord with the teachings of the present invention.

While the present invention may be used in combination with existing structures, FIGS. 4 and 5 illustrate two possible configurations of lights created optimally for optical communication. Both preferred embodiment lights 400, 500 are designed for LED lights that may be powered by or backed-up by solar energy panels 402, 502, respectively, though they may alternatively or additionally rely upon power conduits 405, 505. These lights may be designed to operate in an emergency communications mode using very short duty cycle pulses in the event of an emergency back-up or loss of power line power, or even continuously in the low power mode if there are not sufficient battery reserves available. An exemplary emergency power operation is illustrated and described in my co-pending applications incorporated herein above by reference. The light illustrated in FIG. 4 most preferably provides focused light as an output at transmitter 422, and a receiver 420. As a result, light 400 may serve as a relay. One or more focused outputs may be provided, and additional receivers may also be provided.

The light illustrated in FIG. 5 is preferably a street light or the like, and may include not only a broad illumination pattern from a Visible Light Embedded Communications (VLEC) source 510, but may further be provided with receivers and transmitters for focused beams, similar to 410, 420 of FIG. 4.

For LED lights as discussed herein to replace an existing bulb, regardless of type, and benefit from the many features enabled in the preferred embodiment, communications circuitry must also be provided. This communications circuitry is necessary to properly illuminate each of the red, green and blue LEDs to desired color and to transport data through optical communication channel 113.

Location based services within a VLEC infrastructure will additionally include improved and secure content. One example is a consumer shopping mall where general consumers can walk around and discover the exact location of the goods or services they need. This is accomplished by simply providing a portal for any business to place information about their goods and services. The information is then incorporated into the BPL infrastructure by means of application controlling devices which links to the overall office or place of business VLEC grid. Another is in a major office complex where security personnel can identify personnel in other offices as they patrol the grounds by simply having the information provided to them in real time. With all business personnel having an assigned badge with VLEC technology, the system can locate individuals in meetings and alert them if needed. Personal Navigation devices will have the added advantage of providing improved coordination and collaboration methods by providing an increase in friend to friend location services. A friend to friend location service is an optional service whereby a personal list of friends or family members equipped with VLEC technology GPSRS devices can be created in a data base and that data base is managed by the group participants. When needed they utilize a VLEC GPSRS client device that associates with a VLEC host and then with a connection of some form through a controller in the home that connects or interfaces over BPL to the Internet. The Information will then traverse the Internet and arrive at the predetermined location based on a designed collaboration (containing all Internet protocol addresses subnets and Ports designed for this purpose) by the Friends involved to create this network. The Controlling device will contain reference, relationship, awareness or look-up tables and establish in a fraction of a second, the location of the entity they are seeking. A separate database is compiled by businesses that opt into this service similar to today's location based services which can provide the user with a given experience sought after by the business:(sales of goods or services). This information is then embedded or encapsulated into the data stream and transceived throughout the Internet. Today's cumbersome RF calculations require algorithmic math computations that are constantly changing and therefore reduce the accuracy of locating the device in real-time. A reference back to the previous or last known location requires constant updates. Couple this with the inherent latencies of today's devices and effectiveness is reduced. Based on RF applications, an individual may measure the RSSI (radio signal strength indicator) and relate this information to another calculation table before the system can apply probable table coordinates in order to perform a triangulation calculation of the client device. The RF Location based services rely heavily on assisted GPS technology. This technology is very taxing and expensive on computers, and contributes to a poor economy of scale approach for businesses. GPSRS will embed location information.

While the foregoing details what is felt to be the preferred embodiment of the invention, no material limitations to the scope of the claimed invention are intended. Further, features and design alternatives that would be obvious to one of ordinary skill in the art are considered to be incorporated herein.

The scope of the invention is set forth and particularly described in the claims hereinbelow.

What is claimed is:

1. An LED light and communication system comprising:
    at least one optical transceiver, the optical transceiver comprising:
        a light support having a plurality of light emitting diodes and at least one photodetector attached thereto, the light emitting diodes receiving power from a power source;
        a processor in communication with the light emitting diodes and the at least one photodetector, the processor being constructed and arranged to illuminate the light emitting diodes to simultaneously create at least one first light signal, and at least one second light signal, the first light signal being observable to the unaided eyes of an individual and the second light signal not being observable to the unaided eyes of the individual,
        wherein the second light signal comprises at least one data packet, and
        wherein the at least one data packet comprises global positioning system (GPS) location information.

2. The system of claim 1, the at least one optical transceiver comprising a destination optical transceiver, wherein the at least one data packet includes the GPS location information of the destination optical transceiver.

3. The system of claim 2, the at least one optical transceiver further comprising an origin optical transceiver, wherein the at least one data packet includes the GPS location information of the origin optical transceiver.

4. The system of claim 2, the at least one optical transceiver further comprising an origin optical transceiver and a second optical transceiver between the origin optical transceiver and the destination optical transceiver, wherein the at least one data packet includes the GPS location information of the origin optical transceiver and the second optical transceiver.

5. An LED light and communication system comprising:
    at least one optical transceiver, the optical transceiver comprising:
        a light support having a plurality of light emitting diodes and at least one photodetector attached thereto, the light emitting diodes receiving power from a power source;
        a processor in communication with the light emitting diodes and the at least one photodetector, the processor being constructed and arranged to illuminate the light emitting diodes to simultaneously create at least one first light signal, and at least one second light signal, the first light signal being observable to the unaided eyes of an individual and the second light signal not being observable to the unaided eyes of the individual,
        wherein the second light signal comprises at least one data packet, and
        wherein the at least one data packet comprises global positioning system (GPS) routing information.

* * * * *